(12) United States Patent
McClanahan et al.

(10) Patent No.: US 6,973,211 B2
(45) Date of Patent: Dec. 6, 2005

(54) COLOR MANAGEMENT AND SOLUTION DISTRIBUTION SYSTEM AND METHOD

(75) Inventors: Craig J. McClanahan, Bowling Green, OH (US); Cynthia J Frank, Toledo, OH (US); Stephen F. Shufeldt, Toledo, OH (US)

(73) Assignee: BASF Corporation, Southfield, MI (US)

( * ) Notice: Subject to any disclaimer, the term of this patent is extended or adjusted under 35 U.S.C. 154(b) by 570 days.

(21) Appl. No.: 10/206,556

(22) Filed: Jul. 26, 2002

(65) Prior Publication Data

US 2002/0191843 A1    Dec. 19, 2002

Related U.S. Application Data

(63) Continuation-in-part of application No. 09/874,700, filed on Jun. 5, 2001.

(51) Int. Cl.[7] .............................................. G06K 9/00
(52) U.S. Cl. ........................ 382/162; 382/167; 706/16; 706/20
(58) Field of Search ................................ 382/162, 167, 382/166; 700/123; 702/32, 127, 104, 85; 706/20, 16; 345/589

(56) References Cited

U.S. PATENT DOCUMENTS

| | | | |
|---|---|---|---|
| 5,410,637 A | 4/1995 | Kern et al. ................... 395/61 |
| 5,546,195 A | 8/1996 | Arai ........................... 358/518 |
| 5,559,604 A | 9/1996 | Arai ........................... 356/402 |
| 5,579,031 A | 11/1996 | Liang ......................... 345/154 |
| 5,680,333 A | 10/1997 | Jansson ....................... 364/578 |
| 5,687,000 A | 11/1997 | Nakaoka ...................... 358/296 |
| 5,729,360 A | 3/1998 | Kita et al. ................... 358/500 |
| 5,761,070 A | 6/1998 | Conners et al. ......... 364/478.11 |
| 5,771,311 A | 6/1998 | Arai ........................... 382/162 |
| 5,774,230 A | 6/1998 | Goto .......................... 358/298 |
| 5,798,943 A | 8/1998 | Cook et al. .................. 364/526 |
| 5,864,834 A | 1/1999 | Arai ........................... 706/16 |
| 5,899,605 A | 5/1999 | Caruthers, Jr. et al. ..... 399/223 |
| 5,929,906 A | 7/1999 | Arai et al. ................... 348/223 |
| 6,088,475 A | 7/2000 | Nagashima et al. ........ 382/162 |
| 6,772,151 B1 * | 8/2004 | Johnston et al. ............... 707/6 |
| 2002/0021439 A1 * | 2/2002 | Priestley et al. ......... 356/243.5 |
| 2002/0156917 A1 * | 10/2002 | Nye ........................... 709/238 |
| 2003/0163262 A1 * | 8/2003 | Corrigan et al. ............. 702/32 |
| 2003/0174143 A1 * | 9/2003 | Rice et al. .................. 345/589 |

FOREIGN PATENT DOCUMENTS

| | | | |
|---|---|---|---|
| EP | 0 484 564 | 11/1990 | |
| EP | 484 564 | 11/1990 | ............. G01J 3/46 |
| EP | 1 139 234 | 2/2001 | |
| GB | 105 63 58 | 10/1963 | |
| WO | WO 94/14039 | 6/1994 | ............. G01J 3/46 |
| WO | WO 98/12520 | 3/1998 | ............. G01J 3/46 |
| WO | WO 99/01982 | 1/1999 | ............. H04N 1/60 |
| WO | WO 00/45141 | 8/2000 | ............. C01J 3/46 |
| WO | WO 00/65847 | 11/2000 | ............. H04N 9/64 |
| WO | WO01/44767 | 6/2001 | |
| WO | WO01/97090 | 12/2001 | |

OTHER PUBLICATIONS

BASF Corp. et al., International Search Report for PCT/US/ 02/14092, filed Mar. 5, 2002(IN-5457).

(Continued)

*Primary Examiner*—Kanjibhai Patel
*Assistant Examiner*—Ali Bayat

(57) ABSTRACT

A computer based system and method provides color solutions to a customer over a computer network. A solution request is received from an operator. A composite solution database is searched to determine a color solution as a function of the solution request.

41 Claims, 5 Drawing Sheets

OTHER PUBLICATIONS

BASF Corp. et al., International Search Report for PCT/US/14091, filed Mar. 5, 2002(5459).

U.S. Appl. No. 09/874,700, filed Jun. 5, 2002, BASF Corp. et al.

U.S. Appl. No. 09/874,699, filed Jun. 5, 2001, BASF Corp. et al.

U.S. Appl. No. 09/874,698, filed Jun. 5, 2001, BASF Corp. et al.

U.S. Appl. No. 09/874,697, filed Jun. 5, 2001, BASF Corp. et al.

U.S. Appl. No. 09/779,101, filed Feb. 7, 2001, BASF Corp. et al.

U.S. Appl. No. 09/778,819, filed Feb. 7, 2001, BASF Corp. et al.

English language version of a International Search Report for PCT/US03/18119, Filed Jun. 6, 2003, pp 4.

J Sun, C Yuan: "Web-based 3D interface for product data management", XP-002278607, Sep. 3-5, 2001, pp. 1-6.

Dauner J. Landauer, et al., "3D Product presentation online: The virtual design exhibition", XP002278608, pp. 52-59.

* cited by examiner

COLOR MANAGEMENT AND SOLUTION DISTRIBUTION SYSTEM AND METHOD

CROSS-REFERENCE TO RELATED APPLICATIONS

The present application is a continuation-in-part application of U.S. patent application Ser. No. 09/874,700, which was filed on Jun. 5, 2001.

BACKGROUND OF THE INVENTION

1. Field of the Invention

The present invention relates generally to color matching, and more particularly, to a method and system for providing a color matching solution.

2. Description of the Related Art

Modem vehicles, such as automobiles, typically are offered to consumers in a wide variety of paint colors. In fact, from model year to model year, it is not uncommon for a particular vehicle model to be available in several new paint colors. Actual paint color may vary depending on any number of factors, such as variations in the paint application process. Consequently, when a vehicle's body panels are damaged and require repairs (including repainting), the paint manufacturer supplies one or more paint formulations for the original paint color to customers, such as repair shops.

By supplying a plurality of formulations or variances for a particular color, the paint manufacturer accounts for those factors which affect the actual color. Typically, the formulations for a particular color are distributed to repair shops, i.e., "bump" shops, on paper, microfiche, and/or compact disks (CD). A color tool, composed of swatches of the variances for each color may also be produced and delivered to each customer.

Furthermore, the customer must select which formulation most closely matches that part to be painted. This is typically done visually, i.e., by comparing swatches to the part or spraying a test piece with each formulation.

Different formulations are derived from actual data gathered by inspectors at various locations, e.g., the automobile manufacturer or vehicle distribution point. The inspectors take color measurement readings from new automobiles which have a particular paint color. These readings are used to develop color solutions, i.e., different paint formulations for the same color.

There are several disadvantages to the present method of distributing color solutions in this manner. One disadvantage is the cost. A copy of the paper or CD listing of all of the solutions for each color must be printed and sent to each customer, i.e., repair shop. Furthermore, new formulations are periodically developed. The new formulations and any other corrections must be sent to each customer. It is a time consuming and a laborious process to make sure every customer has the most up to date formulations.

Further, many automobiles have auxiliary paint colors. Auxiliary paint colors may be used on various parts of the interior or the exterior of the automobile, for example, trim, molding, cladding, lower two tone colors, wheel covers, bumpers, stripes, or parts within the passenger compartment. Identifying an auxiliary paint color may be difficult, since auxiliary colors are not typically listed on the vehicle identification plate (located on the vehicle). Additionally, as a result of the many different application areas used on recent automobiles, it is often difficult to unambiguously describe the area of interest.

The present invention is aimed at one or more of the problems identified above.

SUMMARY OF THE INVENTION

In one aspect of the present invention, a computer system for providing a color solution for an auxiliary color of a portion of a motor vehicle to be repaired, is provided. The computer system includes a first module located at a remote location and a second module coupled to the first module. The first module is adapted to receive a solution request from an operator. The solution request includes an identification of the motor vehicle to be repaired, a main body color, and the portion of the motor vehicle to be repaired. The second module includes a composite solution database and a search routine coupled to the composite solution database. The second module is adapted to receive the solution request from the first module. The search routine is adapted to search the composite solution database and to determine the color solution as a function of the solution request.

In another aspect of the present invention, a computer based method for providing a color solution for an auxiliary color of a portion of a motor vehicle to be repaired is provided. The method includes the steps of receiving a solution request from an operator located at a remote location and delivering the solution request from the remote location to a central location over the computer network. The solution request includes an identification of the motor vehicle to be repaired, a main body color, and the portion of the motor vehicle to be repaired. The method also includes the step of searching a composite solution database and determining the color solution as a function of the solution request.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

1. Overview

Referring to the Figs., wherein like numerals indicate like or corresponding parts throughout the several views, a computer system 100 for managing and providing color solutions, such as paint, pigments or dye formulations, is provided.

Figure 1:
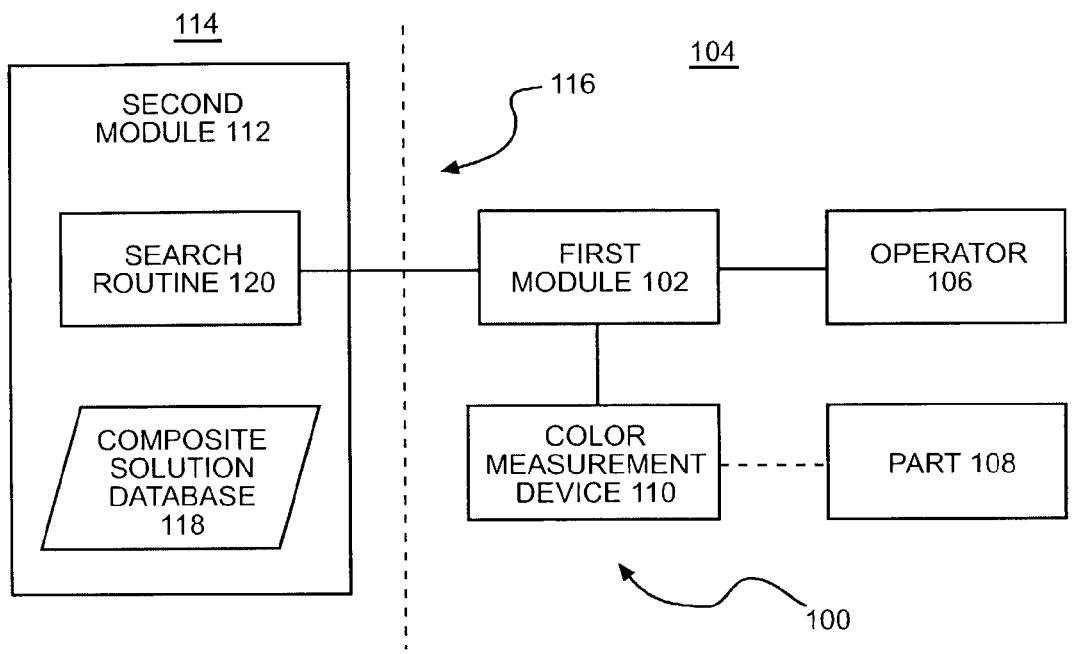
FIG. 1 is a block diagram of a color management and solution distribution system, according to an embodiment of the present invention.

With particular reference to FIG. 1, in a first embodiment, the system 100 includes a first module 102 located at a remote location 104, such as a customer site. Preferably, the first module 102 is implemented on a computer (not shown), such as a personal computer or wireless computing device. The first module 102 is adapted to be operated by a user or operator 106, i.e., the customer. The operator 106 inputs a solution request to the first module 102. The solution request includes a paint identifier (or color code) which identifies the paint color of a subject part 108, such as an automobile body part and color measurements from a color measurement device 110.

The color measurement device 110 is used to provide color measurements, i.e., an indication of the actual color of the subject part 108 to be painted. Preferably, the color measurement device 110 is a spectrophotometer such as is available from X-Rite, Incorporated of Grandville, Mich. as model no. MA58. Alternatively, the color measurement device 110 may be a spherical geometry color measuring device, a digital camera or other suitable device.

The first module 102 is coupled to a second computer based module 112 located at a central location 114, such as the paint manufacturer's facility. The first and second computer based modules 102, 112 are coupled across a computer network 116. In the preferred embodiment, the computer network 116 is the internet.

The second module 112 receives the solution request from the operator 106 via the first module 102 and the computer network 116. The second module 112 includes a composite solution database 118 and a search engine or routine 120. The search routine 120 is adapted to search the composite solution database 118 and determine a paint color solution as a function of the solution request.

Figure 2:
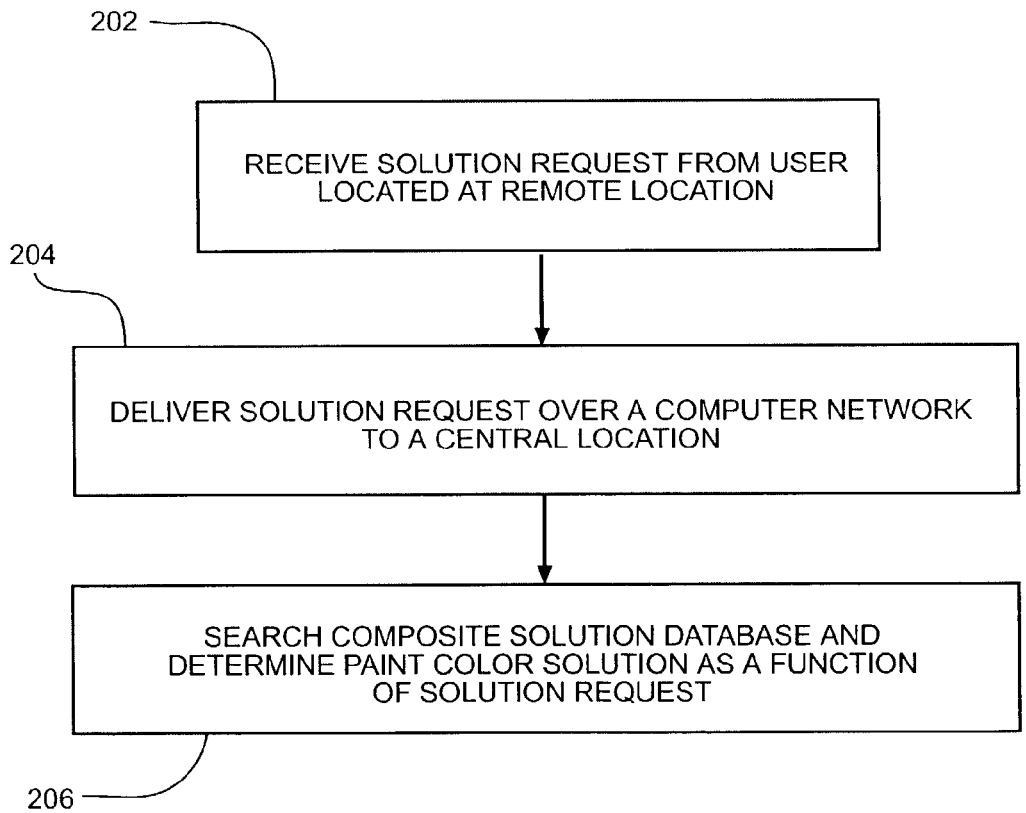
FIG. 2 is a flow diagram of a color management and solution distribution method, according to an embodiment of the present invention.

With reference to FIG. 2, a computer based method for providing paint color solutions to a customer will now be explained. In a first control block 202, the solution request from the operator 106 located at the remote location 104 is received. In a second control block 204, the solution request is delivered over the computer network 116 from the remote location 104 to the central location 104. In a third control block 206, the composite solution database 118 is searched and a paint color solution is determined as a function of the solution request.

Figure 3:
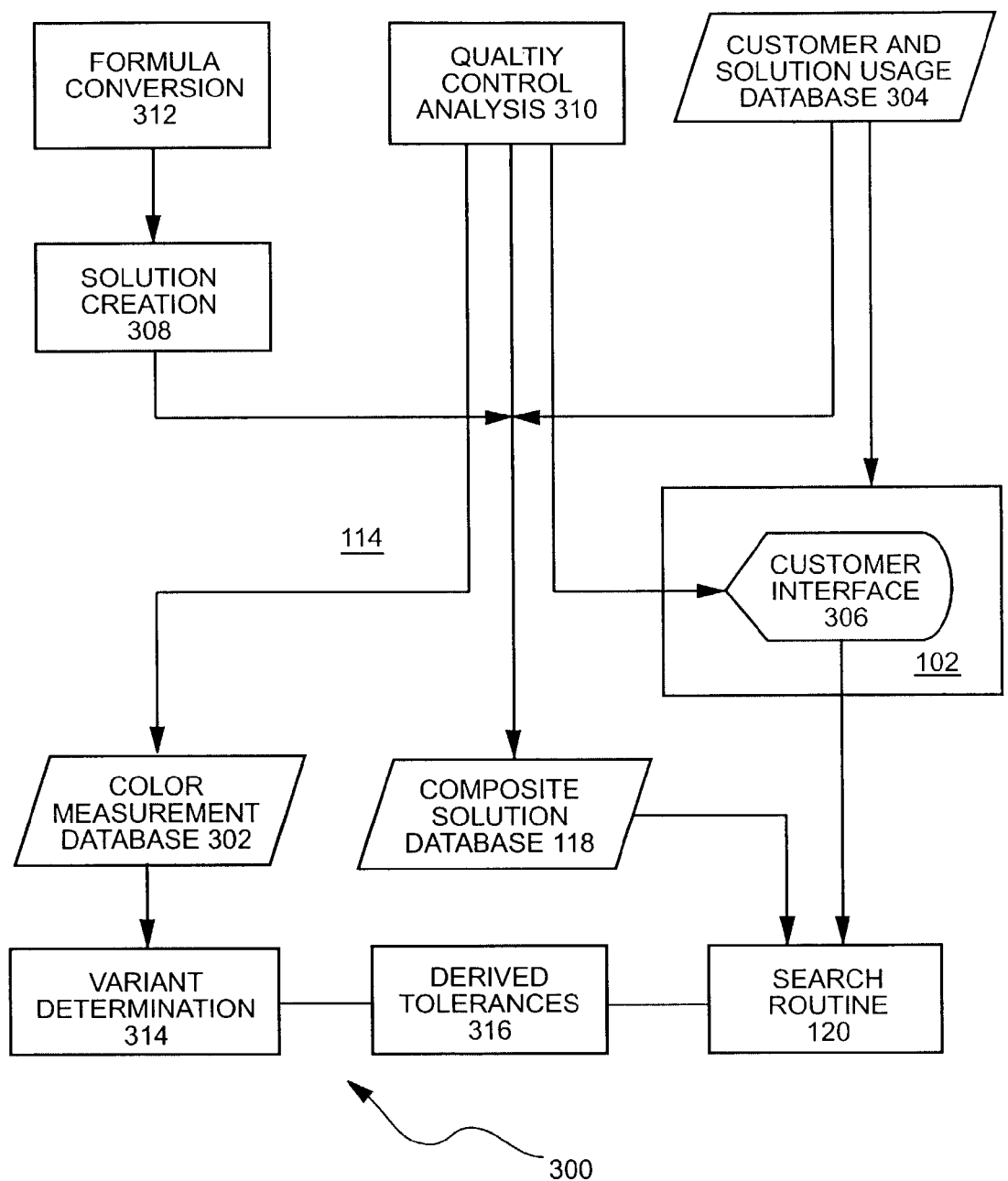
FIG. 3 is a block diagram of a color management and solution distribution system, according to another embodiment of the present invention.

With particular reference to FIG. 3, in a second embodiment, a system 300 for managing and providing color solutions is provided. The system 300 includes three databases: the composite solution database 118, a color measurement database 302, and a customer and solution usage database 304.

A customer interface 306 is implemented on the first module 102 located at the remote location 104. The customer interface 306 allows the operator 106 to log on to the system, communicate with the system 100, 300, e.g., to request color solutions, and to receive color solutions from the system 100, 300. The customer interface 306 is graphical in nature, and, preferably, is accessed through a generic world wide web (WWW) browser, such as Microsoft™ Internet Explorer, available from Microsoft of Redmond, Wash.

The customer interface 306 may be implemented in hyper text markup language (HTML), the JAVA language, and may include JavaScript. The system 300 also includes several processes: a solution creation process 308, a quality control process 310, a formula conversion process 312, a variant determination process 314, and a derived tolerance process 316. Each of the databases 118, 302, 304 and the processes 308, 310, 312, 314, 316 will be explained further below.

Figure 4:
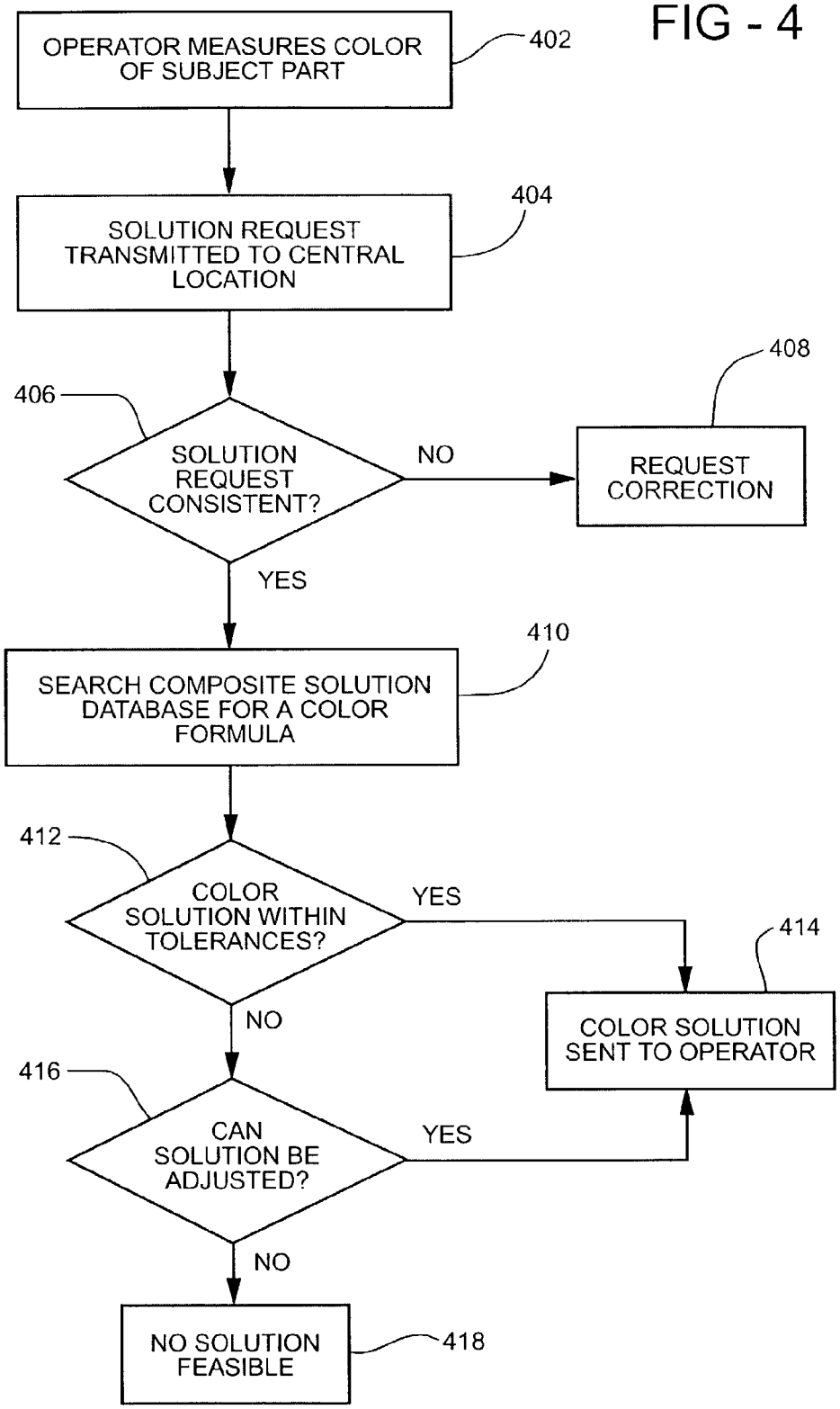
FIG. 4 is a flow diagram of a color management and solution distribution method, according to another embodiment of the present invention.

With reference to FIGS. 3 and 4, basic operation of the system 300 will now be discussed. In a fourth process block 402, the operator 106 measures the color of the part 108, which needs to be painted, using the color measuring device 110. As stated above, the color measuring device 110 may be a spectrophotometer, a digital camera or other suitable device. Preferably, the color measuring device 110 is a spectrophotometer which measures reflective values. The color measurements of the part 108 are taken at multiple angles using industry known methods.

In a fifth process block 404, the color measurement data along with other identifying data (collectively known as a solution request) are transmitted over the computer network 116 to the central location 114. The identifying data includes at least a paint color code which represents the original color of the part 108. Preferably, the identifying data includes a customer identification number or identifier, vehicle information (make, model, model year), color code and desired paintline. Paintline refers to different types of paint available from the manufacturer, which typically balance product features and cost.

In a first decision block 406, the solution request is analyzed by the quality control analysis process 310 to ensure that the data contained in the solution request is accurate. For example, the quality control analysis process 310 compares the given color code with the color measurements to make sure that it is the right color. In another example, the color code and vehicle data are compared to make sure that the color was available on the particular model. If the solution request is inconsistent, the inconsistencies are reported to the operator 106 in a sixth process block 408. The operator 106 is requested to make corrections through the customer interface 306.

Once the solution request has been approved by the quality control analysis process 310, control proceeds to a seventh process block 410. In the seventh process block 410, the search routine 120 searches the composite solution database 118 for a color solution (formulation) which most closely matches the solution request. The search routine 120 compares the color solution with tolerances determined by the derived tolerance process 316 (see below).

In a second decision block 410, if the color solution is within the tolerances, than the color solution is sent to the operator 106 at the remote location 104 in a eighth process block 414. If the color solution is not within the given tolerances, than control proceeds to a third decision block 416. In the third decision block 416, the solution creation process 308 attempts to adjust the solution to be within tolerances and/or creates a new solution. If the color solution can successfully adjust the solution or create a new solution, the new solution is sent to the operator 106. Otherwise, the operator 106 is informed that no solution is feasible in a ninth process block 418.

2. Databases

As discussed above, the system 100, 300 includes several databases containing information used in and generated by the various processes 120, 304, 306, 308, 310, 312, 314, 316. The use and content of each of these databases are described below.

A. Composite Solution Database 118

The composite solution database 118 is the main database of the system 100, 300 and contains all current formulations or variants for each paint color.

For example, the paint or color code "4M9" may have multiple formulations contained in the database 118. The composite solution database 118 is coupled to the search routine 120, the solution creation process 308, the quality control analysis process 310, and the customer and solution usage database 304.

For each formulation, the composite solution database 118 contains measurement data in the form of color values. Color values refer to color attributes used to quantify color. Examples include, but are not limited to, reflectance values, tristimulus values, and color space values. One example of color space values are defined by $L^*a^*b^*$, where $L^*$ represents luminous intensity, $a^*$ represents a red/green appearance, $b^*$ represents a yellow/blue appearance. Another example of color space values are defined by $L^*, C^*, h$, where $L^*$ represents lightness, $C^*$ represents chroma, and $h$ represents hue. The color values ($L^*, a^*$, and $b^*$ or $L^*, C^*$, and $h$) at various angles are obtained using a color measurement device.

B. Color Measurement Database 302

The color measurement database 302 includes all valid field measurements (color values) for a particular paint color (color code). Preferably, the color measurements included in the database 302 for a particular color code includes all measurements taken by inspectors and all valid measurements received by the system 100, 300 from customers. The color measurement data contained in the database 302 is used by the various processes 120, 308, 310, 312, 314, 316 of the system 100, 300.

C. Customer and Solution Usage Database

The customer and solution usage database 304 contains customer and solution request data gathered by the system 100, 300. For example, the customer and solution usage database may contain information regarding a particular customer, how many times the customer has used the system and what solutions he has requested. This data maybe used to assist in planning for the future in terms of paint color trends and material requirements based on the requested paint solutions.

3. Methods

A. Search Routine 120

As stated above, the search routine 120 is used to search the composite solution database 118 and determine a paint color solution as a function of the solution request. Given the color code or paint identifier (as part of the solution request), the corresponding formulations and associated color values are retrieved from the composite solution database 118.

Using tolerances received from the derived tolerances process 316 (see below), the formulations may be compared with the color measurements received from the operator 106 in the variant determination process 314 (see below). If a match is found, then the solution is sent to the operator 106 via the customer interface 306. If no match is found, then the solution creation process 308 (see below) attempts to derive a new formulation or adjust an existing formulation. If an acceptable solution is derived, then the derived solution is sent to the operator 106 via the customer interface 306. Otherwise, the operator 106 is informed that no solution exists.

B. Derived Tolerances Process 316

Acceptable tolerances vary depending on the color. Tolerances are expressed in differential color values, e.g., $\Delta L^*$, $\Delta C^*$, $\Delta H^*$. The differential values will vary as a function of the color. Historically, these values have been determined manually, i.e., by visual evaluation. The tolerances for that formulation are determined as a function of all of the color measurement values which have been deemed acceptable (usually by visible methods).

In the present invention, the derived tolerances process 316 is embodied in a neural network. The neural network is trained using the color values ($L^*, C^*, h$) for each formulation of each color and the differential color values from all acceptable measurements.

When a proposed color solution has been chosen by the search routine 120, the color values of the solution from the composite solution database 118 and the color measurement data taken from the subject part 108 form the input to the neural network. The output of the neural network is whether or not the color solution is acceptable. Preferably, the neural network is a feed-forward, back propagation neural network. One such neural network is disclosed in commonly assigned U.S. patent application Ser. No. 09/874,699, filed Jun. 5, 2001, which is hereby incorporated by reference.

C. Quality Control Analysis 310

As stated above, the quality control analysis process 310 ensures that the data contained in the solution request is accurate. In other words, the solution request is analyzed for inconsistencies.

D. Solution Creation Process 308

The solution creation process 308 attempts to either create a new solution given the customer's color measurement value or adjust an existing formulation contained in the composite solution database 118 using artificial intelligence methods. One such system is described in commonly assigned U.S. Pat. Nos. 6,714,924 and 6,804,390 both of which are incorporated herein by reference.

E. Formula Conversion Process 312

The formula conversion process 312 is utilized to convert paint formulations between various paint lines. Said process can be used to create needed solutions or starting points for the solution creation process 308. The formula conversion process 312 may be embodied in an artificial neural network.

One such process is disclosed in commonly assigned U.S. patent application Ser. No. 09/874,698, filed Jun. 5, 2001 which is hereby incorporated by reference.

F. Variant Determination Process 308

The variant determination process 308 may be used to select from the plurality of color solutions contained in the composite solution database 118 for a particular color code.

The measurements received from the customer do not necessarily need to go through the variant determination process before being delivered to the customer. The variant determination process is run after the customer's initial need is met, i.e., the customer receives a solution. The variant determination is a cluster analysis of the measurements. There are several reasons for performing this analysis including the following:

1) to determine if new solutions are needed;
2) decide what solutions should be published;
3) select targets for inclusion in color tools; and/or
4) trend analysis.

The variant determination process 308 compares the formulations with the color measurements of the part 108. Preferably, the variant determination process is accomplished using artificial intelligence techniques. In the preferred embodiment, the variant determination process include a self-organizing map (SOM) neural network (not shown).

One such process is disclosed in commonly assigned U.S. Pat. No. 6,892,194, which is hereby incorporated by reference.

4. Auxiliary Color Solutions

With reference to FIGS. 5–8, in another aspect of the present invention, the computer system 100 is adapted to provide a color solution for an auxiliary color of a portion of a motor vehicle to be repaired. As described above, the computer system 100 includes a first module 102 and a second module 106.

In one embodiment, the first module 102 is located at a remote location and the second module 106 is located at a central location. In a second embodiment, the first and second modules 102, 106 are located at a user workstation, e.g., the software is distributed on compact disc (CD).

The first module 102 is adapted to receive a solution request from the operator 106. In one embodiment, the solution request includes an identification of the motor vehicle to be repaired, a main body color, and the portion of the motor vehicle to be repaired. As described above, the second module 112 is coupled to the first module 102 and is located at a central location 114.

Auxiliary colors may include, but are not limited to:
  accent colors, e.g., bumper, Cladding, Lower Two Tone, Molding;
  accessory colors, e.g., Accessories, Chassis, Grille, Light Bezel;
  interior colors;
  primer colors;
  roof colors, e.g., fiberglass, Hardtop, Vinyl;
  stripe colors;
  underhood colors, e.g., Engine, Trunk, Underhood; and,
  wheel colors, e.g., wheels, Wheel Covers.

The second module 106 includes the composite solution database 118 and the search routine 120 coupled to the composite solution database 118, as described above. The second module 106 is adapted to receive the solution request from the first module 102. The search routine 120 is adapted to search the composite solution database and determine the color solution for the auxiliary color as a function of the solution request.

Figure 5:
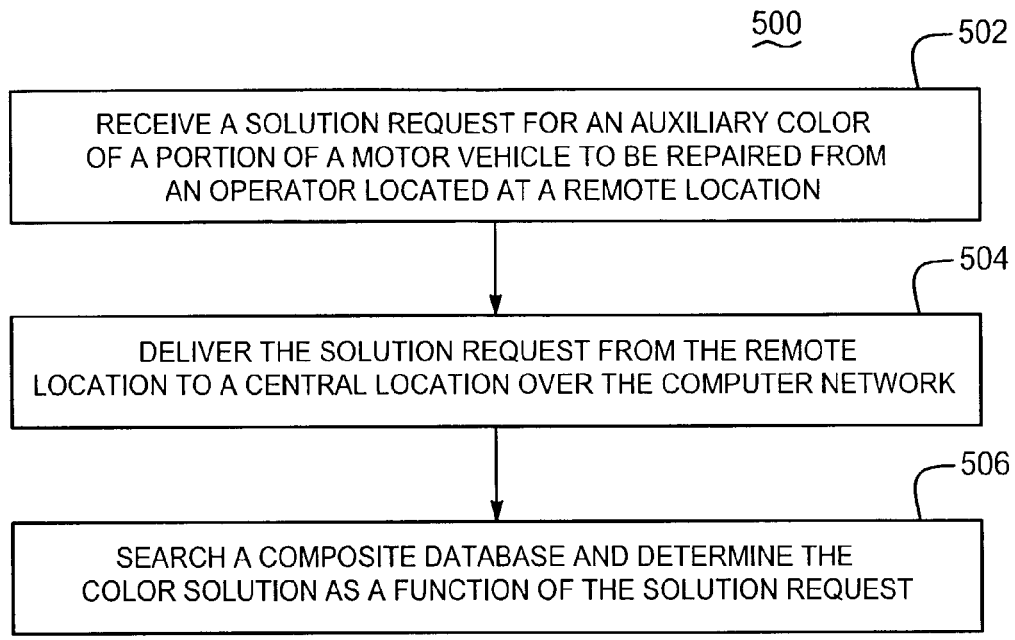
FIG. 5 is a flow diagram of a method for determining an auxiliary color solution, according to an embodiment of the present invention.

With reference to FIG. 5, in another aspect of the present a computer based method 500 for providing a color solution for an auxiliary color of a portion of a motor vehicle to be repaired is provided. In a tenth process block 502, a solution request is received from the operator 106 at a remote location 104.

In one embodiment, the solution request includes an identification of the motor vehicle to be repaired, a main body color, and the portion of the motor vehicle to be repaired. In another embodiment, the solution request may include one of the colors on the vehicle, e.g., the body color. The color may be identified by a color code, a color standard number of a reading from a color measurement device. In still another embodiment, the identification of the motor vehicle may include a special edition, e.g., an Eddie Bauer edition. This may be accomplished by either the user entering the special edition or if the user has identified a vehicle which has a special edition, displaying a button or a pop-up menu which allows the user to select the special edition.

In an eleventh process block 504, the solution request is delivered from the remote location 104 to a central location 114 over a computer network 116. In a twelfth process block 506, the composite solution database 118 is searched to determine the color solution as a function of the solution request.

In one embodiment, the customer interface 306 is adapted to allow the operator 106 to enter the solution request. For example, in a first embodiment the identification of the motor vehicle being repaired includes a make, a model, and a model year.

Figure 6:
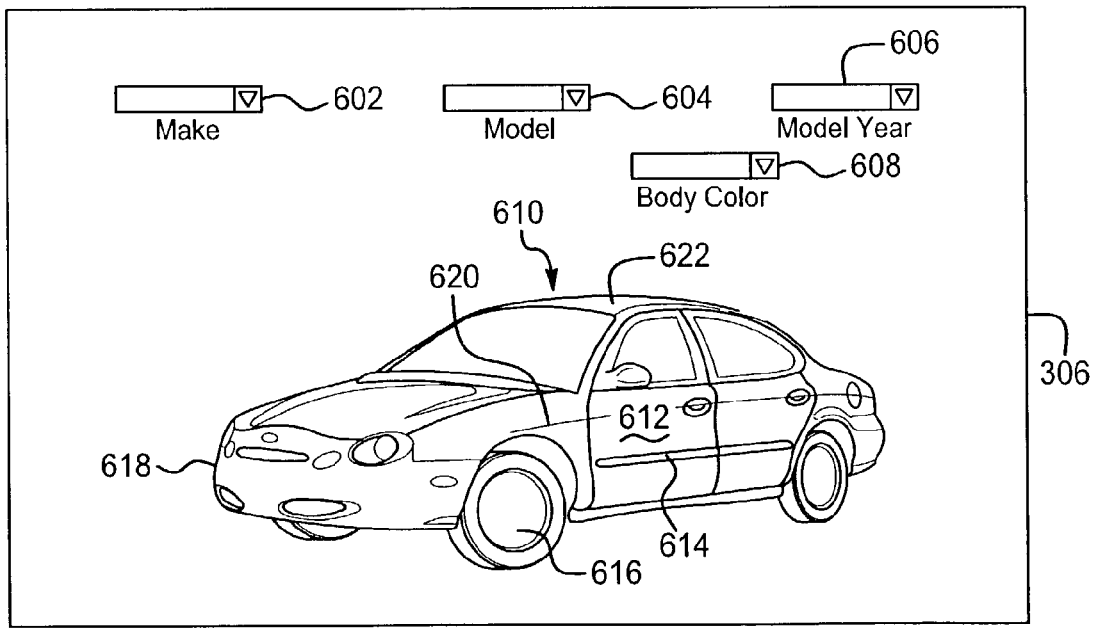
FIG. 6 is a diagrammatical illustration of a portion of a customer interface, according to an embodiment of the present invention.

With reference to FIG. 6, in one embodiment, the customer interface 306 includes a Make drop down list 602, a Model drop down list 604, and a Model Year drop down list 606. The customer interface 306 is adapted to populate the drop down lists 602, 604, 606 based on selected items in the other drop down lists. For example, the choices available on the Model drop down list 604 are based on the selected Manufacturer (i.e., Make) in the Make drop down list 602. Likewise, the Model Year drop down list 606 is populated based on the selections in the Make and the Model drop down lists 602, 604. Alternatively, the customer interface 306 may provide other mechanisms for the operator 106 to select the make, model, and the model year of the motor vehicle.

The customer interface 306 also allows the operator 106 to select the main body color of the motor vehicle being repaired. In the illustrated embodiment, the customer interface 306 includes a Body Color drop down list 608. In a similar manner as described above, the Body Color drop down list 608 is populated based on the selections in the Make drop down list 602, the Model drop down list 604, and the Model drop down list 606.

In one embodiment, the customer interface 306 includes a graphical representation 610 of the motor vehicle being repaired. In a first embodiment of the present invention the graphical representation 610 is three dimensional and may be rotated. The view of the graphical representation may also be enlarged or reduced. In one embodiment, the graphical representation 610 is implemented using a Virtual Reality Modeling language (VRML).

The graphical representation 610 includes the body of the motor vehicle 612, as well as the auxiliary portions of the motor vehicle for which paint color solutions exist. Examples of such auxiliary portions include trim or molding 614, wheel covers 616, bumpers 618, stripes 620, roofs or vinyl roofs 622, and parts within a passenger compartment 624 of the motor vehicle.

In one embodiment, the graphical representation 610 includes (or displays) the main body color and a color associated with at least one auxiliary part of the motor vehicle.

In a first embodiment, the customer interface 306 allows the operator 106 to select the portion of the motor vehicle through interaction with the graphical representation 610 of the motor vehicle. For example, once the make, model, and model year of the motor vehicle to be repaired are selected by the operator 106, the selected motor vehicle is represented by the graphical representation 610. Once the main body color is selected, the body 612 of the graphical representation 610 is displayed with the main body color. For the selected main body color, different portions of the motor vehicle may have a plurality of colors available. In order to select the correct color, the operator may "click" on the correspond portion of the graphical representation. In the first embodiment, clicking on the corresponding portion will cycle through the available paint colors for that portion of the motor vehicle. As the available colors are cycled, the corresponding portion of the graphical representation 610 will be displayed in the selected color.

Figure 7:
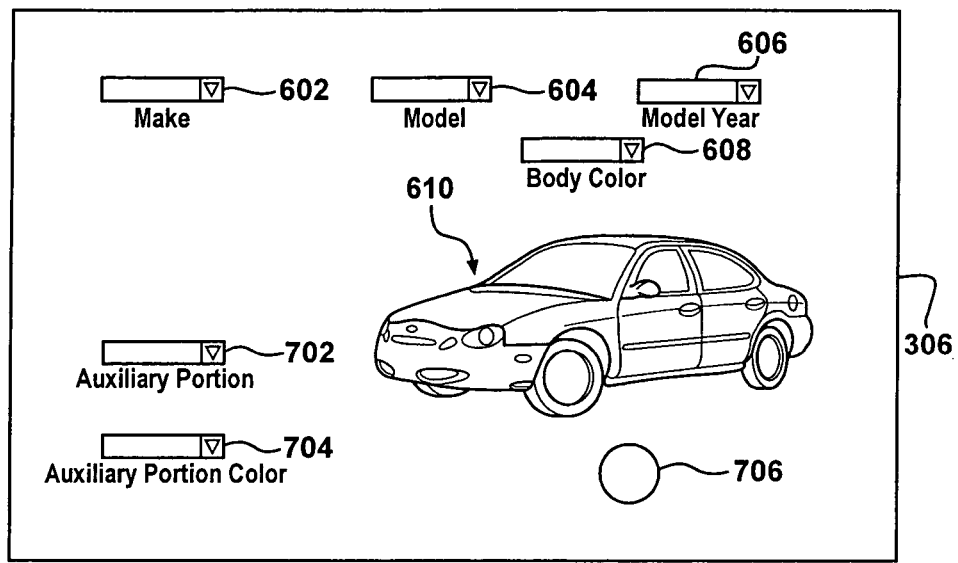
FIG. 7 is a diagrammatical illustration of a portion of a customer interface, according to another embodiment of the present invention; and, FIG. 8 is a diagrammatic illustration of a portion of a customer interface, according to still another embodiment of the present invention.

With reference to FIG. 7, in another embodiment the customer interface 306 allows the operator 106 to select the portion of the motor vehicle from a list, e.g., an Auxiliary Portion drop down list 702. Once the auxiliary portion of the motor vehicle to be repaired is selected, an Auxiliary Portion Color drop down list 704 is populated with the available colors. Once a color is selected in the Auxiliary Portion Color drop down list 704 it may be displayed either on the graphical representation 610 or in a color sample 706 displayed in the customer interface.

Figure 8:
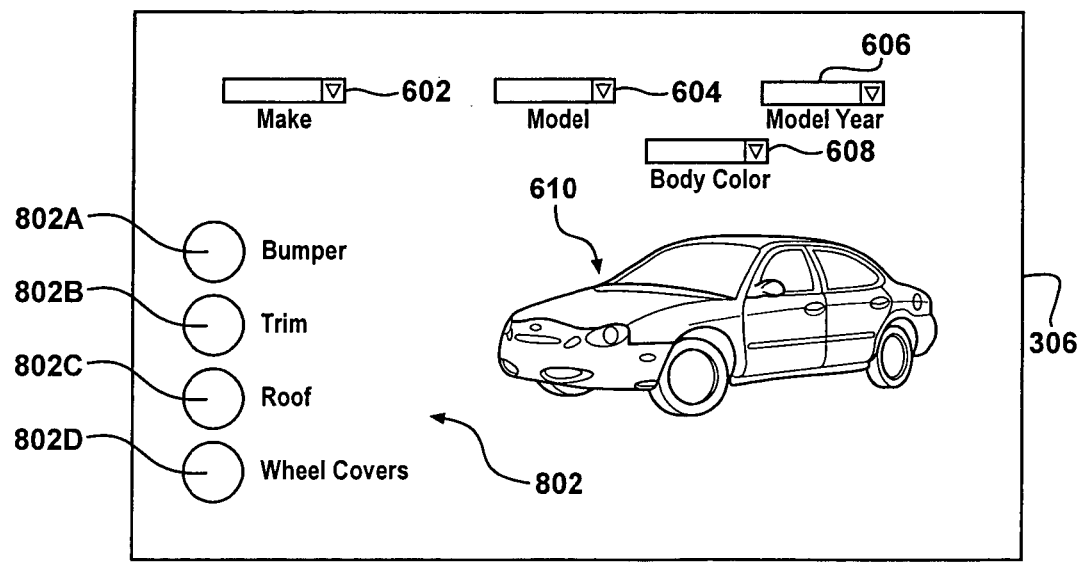

In another embodiment, as illustrated in FIG. 8, the customer interface 306 displays the auxiliary color in a color sample 802 associated with the portion of the motor vehicle being repaired. A color sample 802A, 802B, 802C, 802D may be displayed in the customer interface 306 for each portion of the motor vehicle for which a paint color solution exists. For example, as shown, color samples 802A, 802B, 802C, 802D are displayed for the bumper, trim, roof, and wheel covers. In one embodiment, the operator 106 may cycle through available paint colors for a portion of the motor vehicle being repaired by clicking on the portion of the motor vehicle being repaired within the graphical representation of the motor vehicle. Alternatively, or in addition, the operator 106 may cycle through available paint colors by clicking on the respective color sample 802A, 802B, 802C, 802D.

It should be noted that, although, the customer interface 306 has been described with particular elements, i.e., drop down lists and/or color samples, the present invention may be implemented using other components without departing from the spirit of the invention.

In another aspect of the present invention, the customer interface 306 is adapted to display information regarding each color (on a respective part), e.g., the color name, type, standard number and color code for each color. In one embodiment, the information regarding each color may be displayed in a pop-up displayed when the user right-clicks on the respective part.

Once the correct color for the part or parts being repaired are identified by the operator 106 using the customer interface 306, the solution request may be submitted to the second module 112. As described above, the second module 112 searches the composite solution database 118 for the corresponding color solution and returns the color solution to the operator 106 through the first module 102.

What is claimed is:

1. A computer system for providing a color solution for an auxiliary color of an auxiliary portion of a motor vehicle to be repaired, comprising:
   a first module having a customer interface defining a graphical representation of a main body color and the auxiliary color associated with at least one auxiliary portion of the motor vehicle, the first module being adapted to receive a solution request from an operator, the customer interface being adapted to allow the operator to enter the solution request with the solution request including an identification of the motor vehicle to be repaired, the main body color, and the auxiliary portion of the motor vehicle to be repaired; and
   a second module coupled to the first, the second module including a composite solution database and a search routine coupled to the composite solution database and being adapted to receive the solution request from the first module, the search routine being adapted to search the composite solution database and determine the color solution as a function of the solution request.

2. The computer system, as set forth in claim 1, wherein the first module is located at remote location and the second module is located at a central location, the first and second modules being coupled by a computer network.

3. The computer system, as set forth in claim 2, wherein the computer network is the internet.

4. The computer system, as set forth in claim 1, wherein the identification of the motor vehicle being repaired includes a make, a model, and a model year.

5. The computer system, as set forth in claim 1, wherein the customer interface includes a graphical representation of the motor vehicle being repaired.

6. The computer system, as set forth in claim 5, wherein the graphical representation of the motor vehicle being repaired includes the main body color and the auxiliary color associated with the at least one auxiliary portion of the motor vehicle.

7. The computer system, as set forth in claim 6, wherein the at least one auxiliary portion of the motor vehicle may be one of trim, molding, wheel covers, bumper, stripe, roof, vinyl roof, and parts within a passenger compartment of the motor vehicle.

8. The computer system, as set forth in claim 6, wherein the customer interface allows the operator to select the portion of the motor vehicle through interaction with the graphical representation of the motor vehicle.

9. The computer system, as set forth in claim 8, wherein the operator may cycle through available auxiliary colors for the auxiliary portion of the motor vehicle being repaired by clicking on the auxiliary portion of the motor vehicle within the graphical representation of the motor vehicle.

10. The computer system, as set forth in claim 1, wherein the customer interface allows the operator to select the auxiliary portion of the motor vehicle from a list.

11. The computer system, as set forth in claim 1, wherein the customer interface presents the operator with a list of available auxiliary colors for the auxiliary portion of the motor vehicle being repaired as a function of the identification of the motor vehicle, the main body color and the auxiliary portion of the motor vehicle being repaired.

12. The computer system, as set forth in claim 11, wherein the customer interface allows the operator to select the auxiliary color from the list.

13. The computer system, as set forth in claim 12, wherein the customer interface displays the portion of the motor vehicle being repaired with the selected auxiliary color.

14. The computer system, as set forth in claim 1, wherein the customer interface displays the auxiliary color in a color sample associated with the auxiliary portion of the motor vehicle being repaired.

15. The computer system, as set forth in claim 1, wherein the customer interface displays the auxiliary color in a color sample associated with the auxiliary portion of the motor vehicle being repaired, wherein the operator may cycle through available auxiliary colors for the auxiliary portion of the motor vehicle being repaired by clicking on the auxiliary portion of the motor vehicle being repaired within the graphical representation of the motor vehicle.

16. A computer system for providing a color solution for an auxiliary color of an auxiliary portion of a motor vehicle to be repaired, comprising:
   a first module having a customer interface, the first module being adapted to receive a solution request from an operator, the customer interface being adapted to allow the operator to enter the solution request and including a graphical representation of the motor vehicle being repaired with the graphical representation including a main body color and at least one auxiliary color associated with at least one auxiliary portion of the motor vehicle, the solution request including an identification of the motor vehicle to be repaired, the main body color, and the auxiliary portion of the motor vehicle to be repaired; and a second module coupled to the first module, the second module including a composite solution database and a search routine coupled to the composite solution database and being adapted to receive the solution request from the first module, the search routine being adapted to search the composite solution database and determine the color solution as a function of the solution request.

17. The computer system, as set forth in claim 16, wherein the identification of the motor vehicle being repaired includes a make, a model, and a model year.

18. The computer system, as set forth in claim 16, wherein the at least one auxiliary portion of the motor vehicle may be one of trim, molding, wheel covers, bumpers, stripes, roofs, vinyl roofs, and parts within a passenger compartment of the motor vehicle.

19. The computer system, as set forth in claim 16, wherein the customer interface allows the operator to select the portion of the motor vehicle through interaction with the graphical representation of the motor vehicle.

20. The computer system, as set forth in claim 19, wherein the operator may cycle through available auxiliary colors for the auxiliary portion of the motor vehicle being repaired by clicking on the auxiliary portion of the motor vehicle within the graphical representation of the motor vehicle.

21. The computer system, as set forth in claim 16, wherein the customer interface allows the operator to select the portion of the motor vehicle through a list.

22. The computer system, as set forth in claim 16, wherein the customer interface presents the operator with a list of available auxiliary colors for the auxiliary portion of the motor vehicle being repaired as a function of the identification of the motor vehicle, the main body color and the auxiliary portion of the motor vehicle being repaired.

23. The computer system, as set forth in claim 22, wherein the customer interface allows the operator to select the auxiliary color from the list.

24. The computer system, as set forth in claim 23, wherein the customer interface displays the auxiliary portion of the motor vehicle being repaired with the selected auxiliary color.

25. The computer system, as set forth in claim 16, wherein the customer interface displays the auxiliary color in a color sample associated with the auxiliary portion of the motor vehicle being repaired, wherein the operator may cycle through available auxiliary colors for the auxiliary portion of the motor vehicle being repaired by clicking on the color sample.

26. The computer system, as set forth in claim 16, wherein the customer interface displays the auxiliary color in a color sample associated with the auxiliary portion of the motor vehicle being repaired.

27. A computer based method for providing a color solution for an auxiliary color of an auxiliary portion of a motor vehicle to be repaired, including the steps of:

providing a customer interface having a graphical representation;

receiving a solution request from an operator by entering the solution request using the customer interface, the solution request including an identification of the motor vehicle to be repaired, a main body color, and the auxiliary portion of the motor vehicle to be repaired;

searching a composite solution database and determining the color solution for the auxiliary color as a function of the solution request;

displaying a main body color on the graphical representation; and displaying the color solution of the auxiliary color associated with the auxiliary portion of the motor vehicle to be repaired on the graphical representation.

28. The computer based method, as set forth in claim 27, including the step of delivering the color solution to the operator.

29. The computer based method, as set forth in claim 27, wherein the composite solution database includes at least one formulation for a plurality of auxiliary colors.

30. The computer based method, as set forth in claim 27, wherein the identification of the motor vehicle being repaired includes a make, a model, and a model year.

31. The computer based method, as set forth in claim 27, including the step of providing a graphical representation of the motor vehicle being repaired via the customer interface.

32. The computer based method, as set forth in claim 31, including the step of displaying the main body color and the color solution associated with the auxiliary portion of the motor vehicle on the graphical representation of the motor vehicle.

33. The computer based method, as set forth in claim 32, wherein the auxiliary portion of the motor vehicle may be one of trim, molding, wheel covers, bumper, stripe, roof, vinyl roof, and parts within a passenger compartment of the motor vehicle.

34. The computer based method, as set forth in claim 32, including the step of selecting, by the operator, the portion of the motor vehicle through interaction with the graphical representation of the motor vehicle.

35. The computer based method, as set forth in claim 34, including the step of cycling through available auxiliary colors for the auxiliary portion of the motor vehicle in response to the operator clicking on the auxiliary portion of the motor vehicle being repaired within the graphical representation of the motor vehicle.

36. The computer based method, as set forth in claim 27, including the steps of:

providing a list of available auxiliary portions of the motor vehicle; and, allowing the operator to select the auxiliary portion of the motor vehicle from the list.

37. The computer based method, as set forth in claim 27, including the step of presenting to the customer a list of available auxiliary colors for the auxiliary portion of the motor vehicle being repaired as a function of the identification of the motor vehicle, the main body color and the auxiliary portion of the motor vehicle being repaired.

38. The computer based method, as set forth in claim 37, including the step of allowing the operator to select the auxiliary color from the list.

39. The computer based method, as set forth in claim 38, including the step of displaying, using the customer interface, the portion of the motor vehicle being repaired with the selected auxiliary color.

40. The computer based method, as set forth in claim 27, including the step of wherein the customer interface displays the auxiliary color in a color sample associated with the auxiliary portion of the motor vehicle being repaired.

41. The computer based method, as set forth in claim 27, including the steps of:
displaying the auxiliary color in a color sample associated with the auxiliary portion of the motor vehicle being repaired; and,
cycling through available auxiliary colors for the auxiliary portion of the motor vehicle in response to the operator clicking on the color sample.

* * * * *